(12) United States Patent
Wu

(10) Patent No.: US 6,314,845 B1
(45) Date of Patent: Nov. 13, 2001

(54) CLAMP FOR SCREWED FASTENING MEMBER

(76) Inventor: Shu Te Wu, No. 6, Lane 176, Wu Fu Road, Wu Feng Hsiang, Taichung Hsien (TW)

(*) Notice: Subject to any disclaimer, the term of this patent is extended or adjusted under 35 U.S.C. 154(b) by 0 days.

(21) Appl. No.: 09/512,053

(22) Filed: Feb. 24, 2000

(51) Int. Cl.[7] .................................................. B25B 23/08
(52) U.S. Cl. .............................. 81/455; 81/454; 81/457; 81/459
(58) Field of Search .............................. 81/455, 454, 457, 81/459

(56) References Cited

U.S. PATENT DOCUMENTS 3,965,950 * 6/1976 MacDonald .
4,363,250 * 12/1982 Suga .
5,671,642 * 9/1997 Haas .
6,082,233 * 7/2000 Han .

* cited by examiner

Primary Examiner—Joseph J. Hail, III
Assistant Examiner—Willie Berry, Jr.
(74) Attorney, Agent, or Firm—Dougherty & Troxell

(57) ABSTRACT

Clamp for screwed fastening member, including: a main body formed with an internal axial passage; a rod body connected with the main body; two clamping members each having a bottom clamping end, the clamping members being pivotally disposed on the main body and movable to open or close the clamping ends thereof; and a predetermined number of pressing member disposed between the clamping members and the main body for forcedly pressing the clamping members and making the clamping ends thereof extend into the passage and close to clamp an article. A screwed fastening member can be positioned in the main body and clamped by the clamping members, whereby the clamp can be rotated to drive and screw the screwed fastening member.

25 Claims, 9 Drawing Sheets

CLAMP FOR SCREWED FASTENING MEMBER

BACKGROUND OF THE INVENTION

The present invention relates to a clamp, and more particularly to a clamp for clamping screwed fastening members such as self-tightening screws.

In a DIY product, self-tightening screws are often used to lock a work piece. In operation, a screwdriver is used to press a self-tightening screw against the work piece and screw the self-tightening screw into the work piece. The work piece is not drilled with any hole so that the self-tightening screw is purely forcedly screwed into the work piece by the strength of the operator. Therefore, the self-tightening screw has a sharp front tip for nailing into the work piece. Prior to screwing into the work piece, in the case that the force exerted by the operator onto the self-tightening screw is not normally aligned with the self-tightening screw and an oblique component force exists, it often takes place that the self-tightening screw is deflected and dropped or even irregularly bounded out to injure the operator.

In order to solve this problem, a clamp has been developed, which is mounted on the screwdriver for clamping the self-tightening screw. When screwing the screw with a screwdriver, the self-tightening screw can be fixed without deflection, dropping or randomly bounding.

However, the conventional clamp has quite complicated structure and is difficult to manufacture. Therefore, the cost for such clamp is high. Moreover, there are various kinds of self-tightening screws on market and the conventional clamp is only applicable to some of these self-tightening screws.

SUMMARY OF THE INVENTION

It is therefore a primary object of the present invention to provide a clamp for screwed fastening member, which has simpler structure.

It is a further object of the present invention to provide the above clamp for screwed fastening member, which is applicable to all kinds of self-tightening screws.

The present invention can be best understood through the following description and accompanying drawings wherein:

DETAILED DESCRIPTION OF THE PREFERRED EMBODIMENTS

Figure 1:
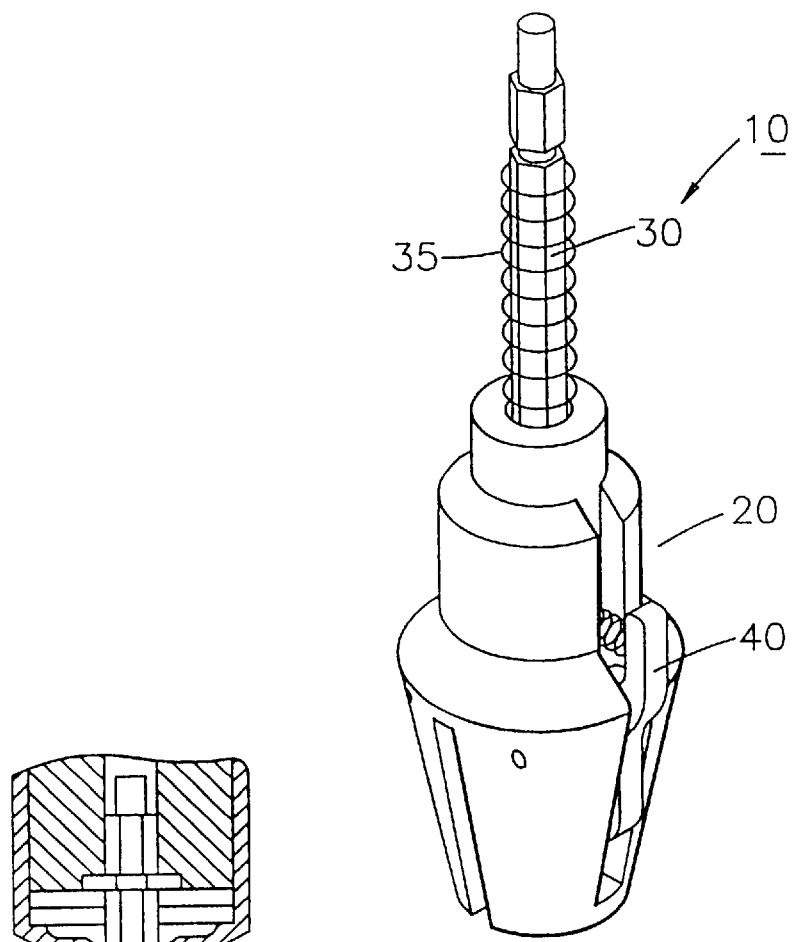
FIG. 1 is a perspective assembled view of a first embodiment of the present invention.
Figure 2:
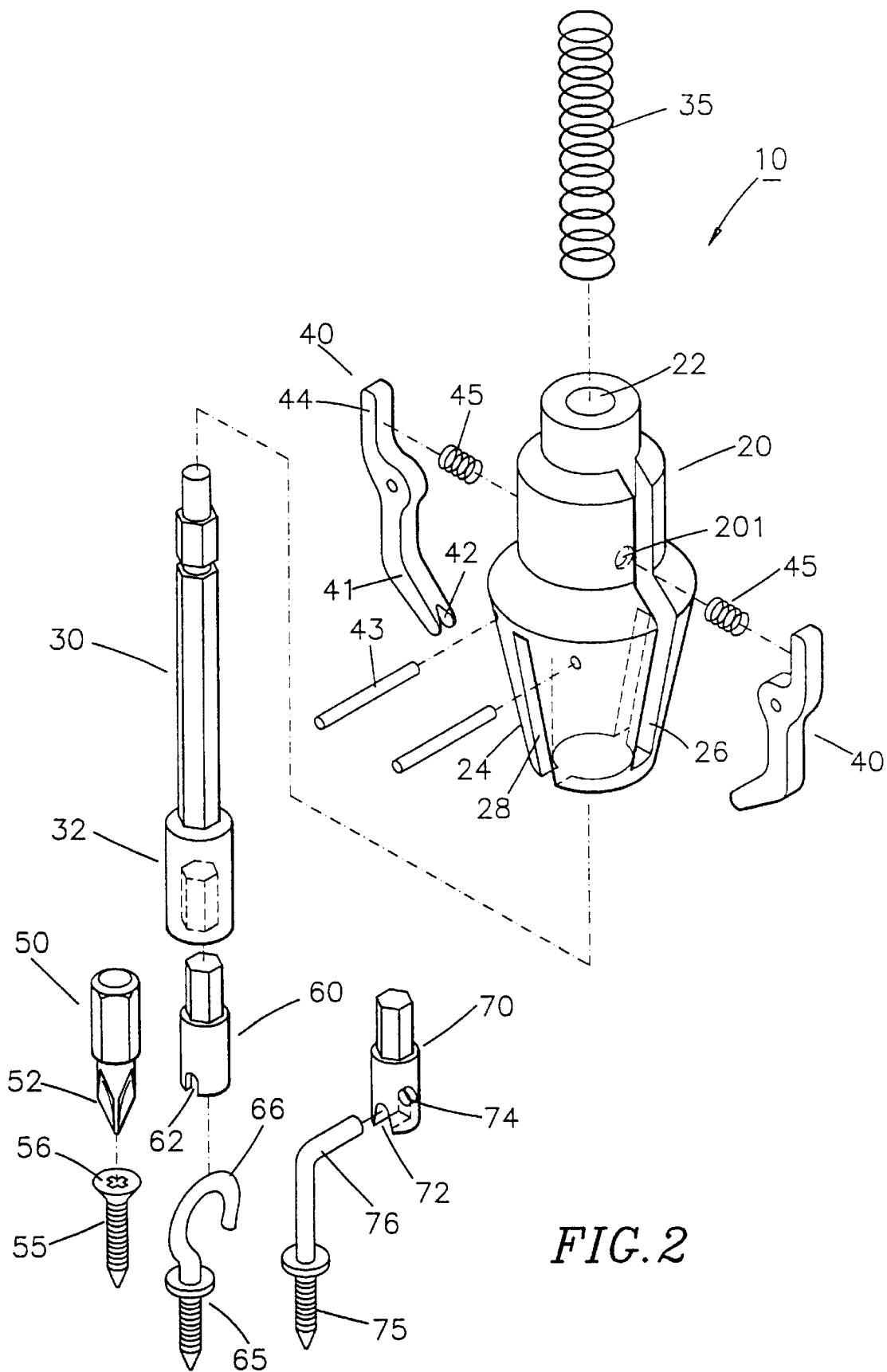
FIG. 2 is a perspective exploded view of the first embodiment of the present invention.
Figures 4, 5:
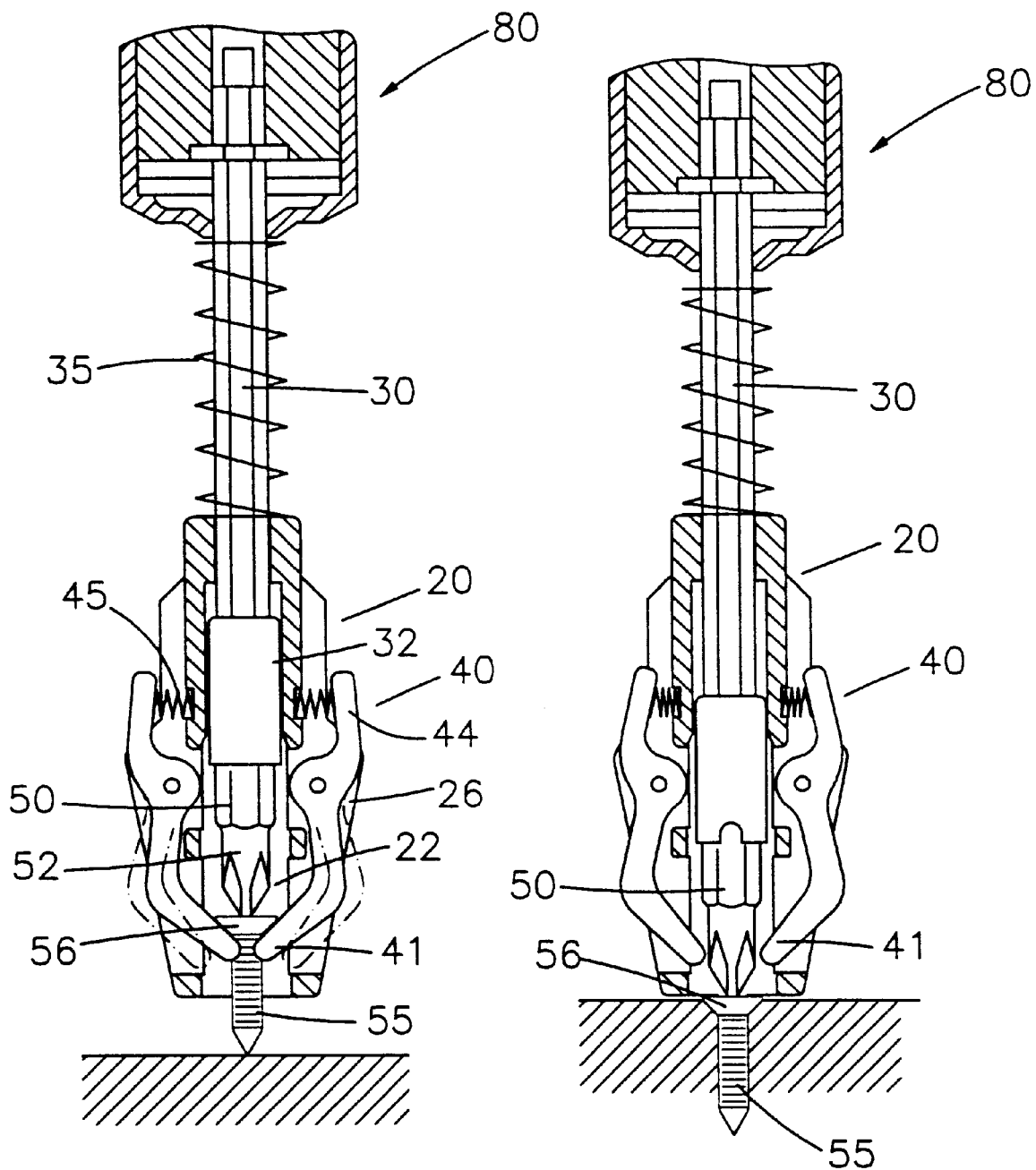
FIG. 4 is a longitudinal sectional view of the first embodiment of the present invention in one using state, showing that a type of self-tightening screw is held.
FIG. 5 is a longitudinal sectional view according to FIG. 4, showing that the self-tightening screw is screwed.

Please refer to FIGS. 1 and 2. The clamp 10 of the present invention includes:

a substantially cylindrical main body 20 formed with an internal axial passage 22, the bottom end of the main body 20 being formed with a cylindrical section 24 with larger outer diameter. Correspondingly, the diameter of the passage 22 at the cylindrical section 24 is slightly larger, the main body 20 being also formed with two slots 26 spaced from each other by 180 degrees and axially formed on the peripheral wall of the main body 20 in communication with the passage 22, the main body 20 being further formed with a radial cut 28 communicating with the passage 22 and containing an angle of 90 degrees with the slots 26, a face of the cut 28 being parallel to the axis of the main body and passing through the bottom end of the main body;

a rod body 30 which can be directly a stem of a screwdriver or a stem able to connect with a screwdriver stem, in this embodiment, the rod body being a screwdriver stem, the bottom end of the rod body being directly integrally formed with a driving section with a flat or a cross-pattern for driving a screw, alternatively, the bottom end being disposed with a fitting section 32 for fitting with various types of driving members 50, 60, 70, in this embodiment, the rod body being disposed with a fitting section, the rod body 30 being passed through the passage 22, whereby the main body 20 being slidable along the rod body, the bottom end of the rod body and the inner wall of the main body being engaged with and stopped by each other, whereby the main body has a lower stop point without detaching from the bottom end of the rod body, the engagement between main body 20 and the rod body 30 being achievable by multiple structures which are not the subject of the present invention and will not be described hereinbelow;

a resilient member 35 fitted on the rod body 30 for resiliently pushing the main body downward, whereby when not suffering external force, the main body is kept positioned at the lower stop point;

two clamping members 40 which are bar members bent by a predetermined angle, the bottom end of each clamping member 40 being a clamping end 41 formed with a clamping notch 42, each clamping member 40 being pivotally disposed in the slot 26 via an insertion pin 43 and swingable about the insertion pin 43; and two pressing members, in this embodiment, the pressing members being two resilient members respectively disposed between the clamping members and the main body, one end of each pressing member 45 being located in a recess 201 formed on the peripheral wall of the main body, while the other end thereof abutting against the top end of the clamping member 40, whereby the bottom clamping end 41 of the clamping member is kept extending into the passage 22 as shown in FIG. 4, while the top end of the clamping member is exposed outside the main body, serving as a pressing section 44 for an operator's hand to press.

In a normal state, the main body 20 of the clamp 10 is downward pushed by the resilient member 35 and shifted to the lower stop point. Under such circumstance, the bottom end of the rod body 30 is entirely received in the main body above the clamping end 41 as shown in FIG. 4.

The rod body 30 can be fitted with various types of driving members for driving specifically shaped self-tightening screws.

FIG. 2 shows three kinds of driving members 50, 60, 70 which can be co-used with the present invention. The first driving member 50 is a conventional one having a driving section 52 at bottom end. The driving section can be cross-shaped, flat, plum blossom-shaped or star-shaped. The bottom end of the second driving member 60 is formed with a radial notch-like fitting section 62. The third driving member 70 is formed with a radial recessed fitting section 72 which only passes through one side of the driving member 70 with the other side thereof remaining close. The close side is formed with a through hole 74 coaxial with the fitting section 72.

Figure 3:
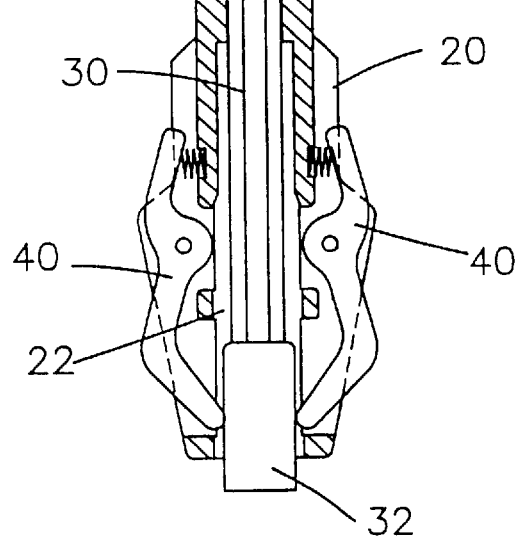
FIG. 3 is a longitudinal sectional view of the first embodiment of the present invention, showing that the driving member is to be replaced.

In use, depending on the pattern of the self-tightening screw to be screwed, a suitable driving member is installed at the bottom end of the rod body 30. When it is desired to install or replace the driving member, the main body is moved upward along the rod body 30 as shown in FIG. 3 to expose the fitting section 32 of the rod body outside the main body. At this time, a necessary driving member can be installed.

After a suitable driving member is installed, the self-tightening screw can be screwed. As shown in FIG. 4, a flat head self-tightening screw 55 is driven. The first driving member 50 is installed at the bottom end of the rod body. The pressing sections 44 of the two clamping members 40 are pressed inward with a hand to stretch the clamping ends 41 outward as shown by the phantom line. Thereafter, the self-tightening screw 55 is passed from the bottom end of the main body 20 into the passage 22 with the head 56 of the self-tightening screw engaged with the driving section 52 of the driving member 50. After the clamping members are released, the clamping members 40 are pushed and restored by the pressing members 45, making the clamping ends 41 clamp the body of the self-tightening screw 55. The body of the self-tightening screw 55 is firmly clamped by the clamping sections 42 of the clamping ends 41, while the head 56 of the self-tightening screw 55 is firmly engaged with the driving member so that the self-tightening screw 55 is stably located without swinging or deflecting.

After clamped, the tip of the self-tightening screw is exposed outside the main body. Then the tip of the self-tightening screw is pressed against the surface of the work piece and the screwdriver 80 is forcedly turned to screw the self-tightening screw into the work piece.

During the procedure of screwing, when the bottom end of the main body 20 touches the work piece, as shown in FIG. 5, the main body will move upward along the rod body 30 and the two clamping ends 41 will move upward along the body of the self-tightening screw, while keeping clamping the body thereof, whereby the rod body 30 can continuously screw the self-tightening screw into the work piece. When the clamping ends touch the head 56 of the screw, the inclined clamping ends will be pushed by the head 56 to stretch outward until they no more clamp the screw 55. At this time, the self-tightening screw has been firmly screwed into the work piece by a considerably deep depth without deflection. Therefore, when the clamping members 40 no more clamp the screw, the screw will not be deflected and can be continuously totally screwed into the work piece.

Figures 6, 7:
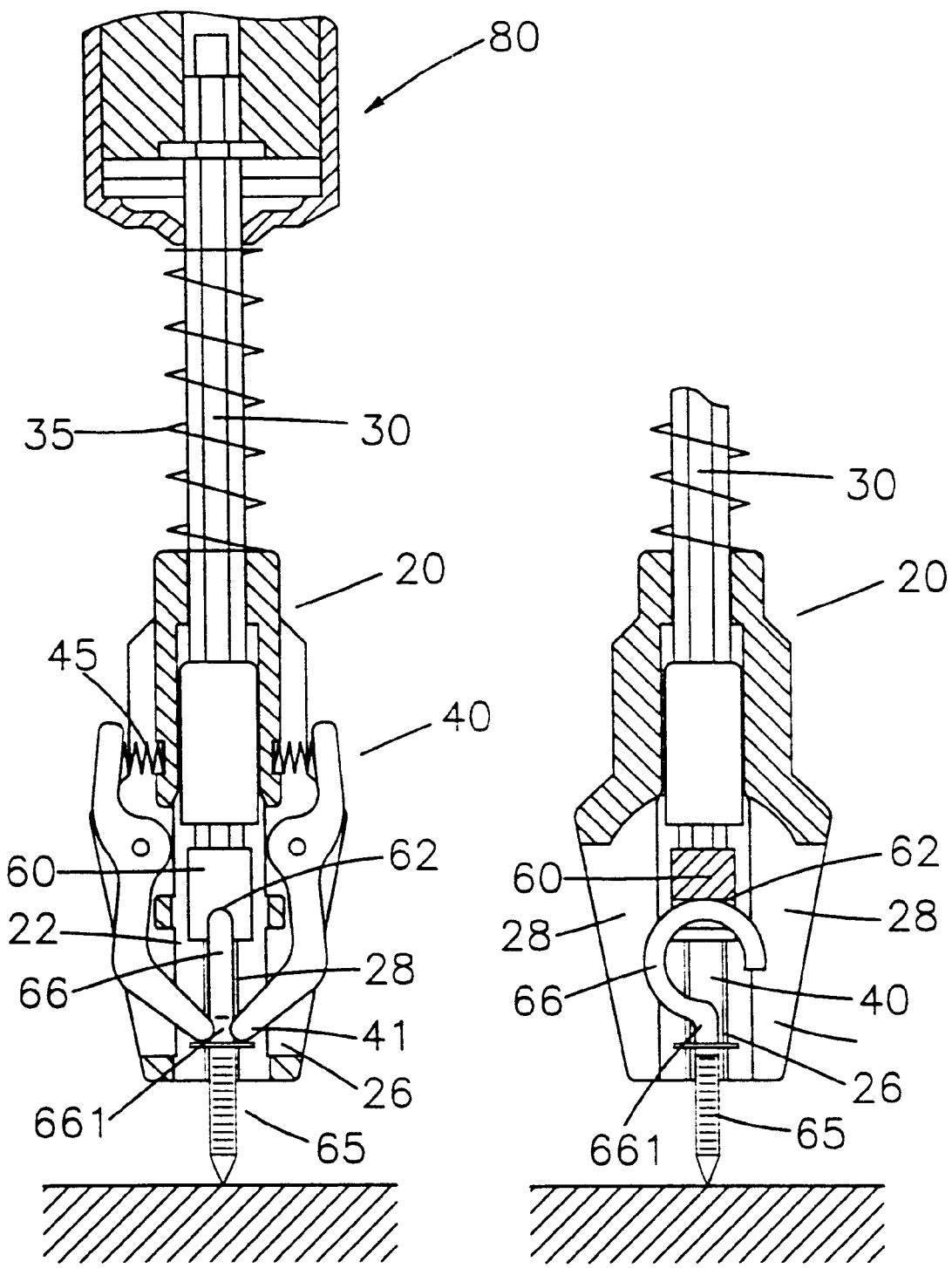
FIG. 6 is a longitudinal sectional view of the first embodiment of the present invention in another using state, showing that another type of self-tightening screw is held.
FIG. 7 is a side longitudinal sectional view according to FIG. 6.

Referring to FIGS. 5 and 6, when tightening an interrogation-shaped self-tightening screw 65 having an arched head 66, the second driving member 60 is fitted with the fitting section 32 of the rod body 30 and the screw 65 is mounted in the passage 22 of the main body 20 with the head 66 of the screw fitted in the fitting section 62 of the driving member 60. The two clamping ends 41 clamp the straight stem section 661 of the head 66 with the body of the screw coaxial with the rod body. Two sides of the head 66 are received in the cut 28 so that no matter how the head 66 is dimensioned, the head can be mounted in the main body and clamped.

Figure 8:
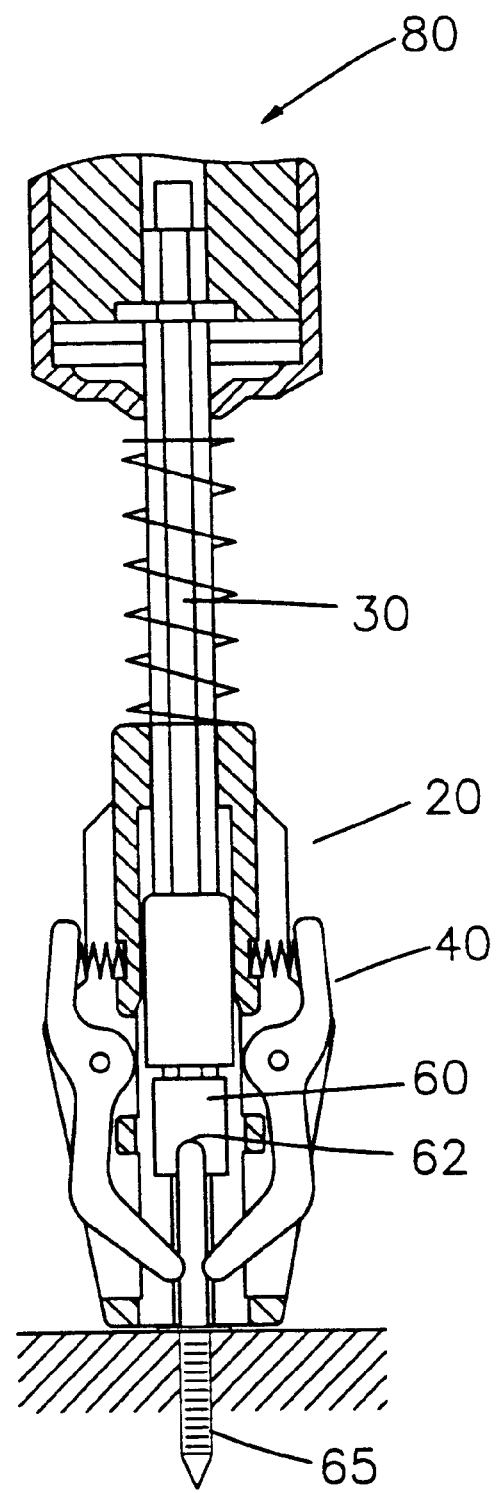
FIG. 8 is a longitudinal sectional view according to FIG. 7, showing that the self-tightening screw is screwed.

When rotating the screwdriver 80, the fitting section 62 of the driving member 60 drives the screw 65 to screw into the work piece. When the bottom end of the main body 20 touches the workpiece, as shown in FIG. 8, the main body 20 and the clamping members 40 are moved upward along the rod body 30 so that the body of the screw can be entirely screwed into the work piece. Then the clamp is separated from the screw.

Figures 9, 10:
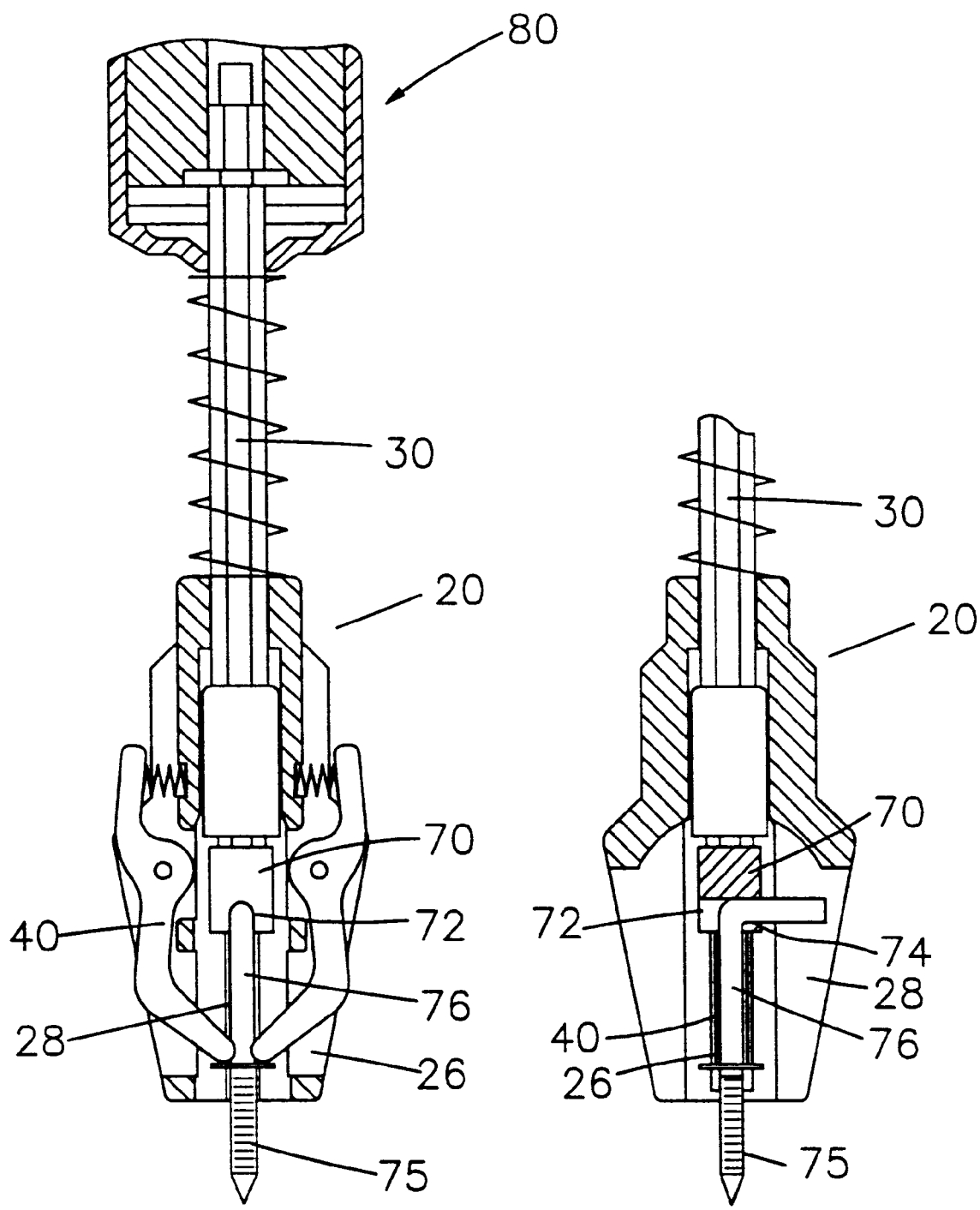
FIG. 9 is a longitudinal sectional view of the first embodiment of the present invention in still another using state, showing that still another type of self-tightening screw is held.
FIG. 10 is a side longitudinal sectional view according to FIG. 9.

Referring to FIGS. 9 and 10, when tightening an L-shaped self-tightening screw 75 having an L-shaped head 76, the third driving member 70 is fitted with the bottom end of the rod body and the screw 75 is mounted in the main body 20 with the head 76 of the screw fitted in the fitting section 72 of the driving member 70. The transverse beam of the head 76 extends out of the through hole 74 into the cut 28. The two clamping members 40 clamp the vertical stem of the head 76 with the body of the screw coaxial with the rod body. Accordingly, no matter how the head 76 is dimensioned, the head can be clamped in the main body.

When rotating the screwdriver 80, the driving member 70 drives the entire body of the screw 75 into the work piece. Then the clamp is separated from the screw.

Figure 11:
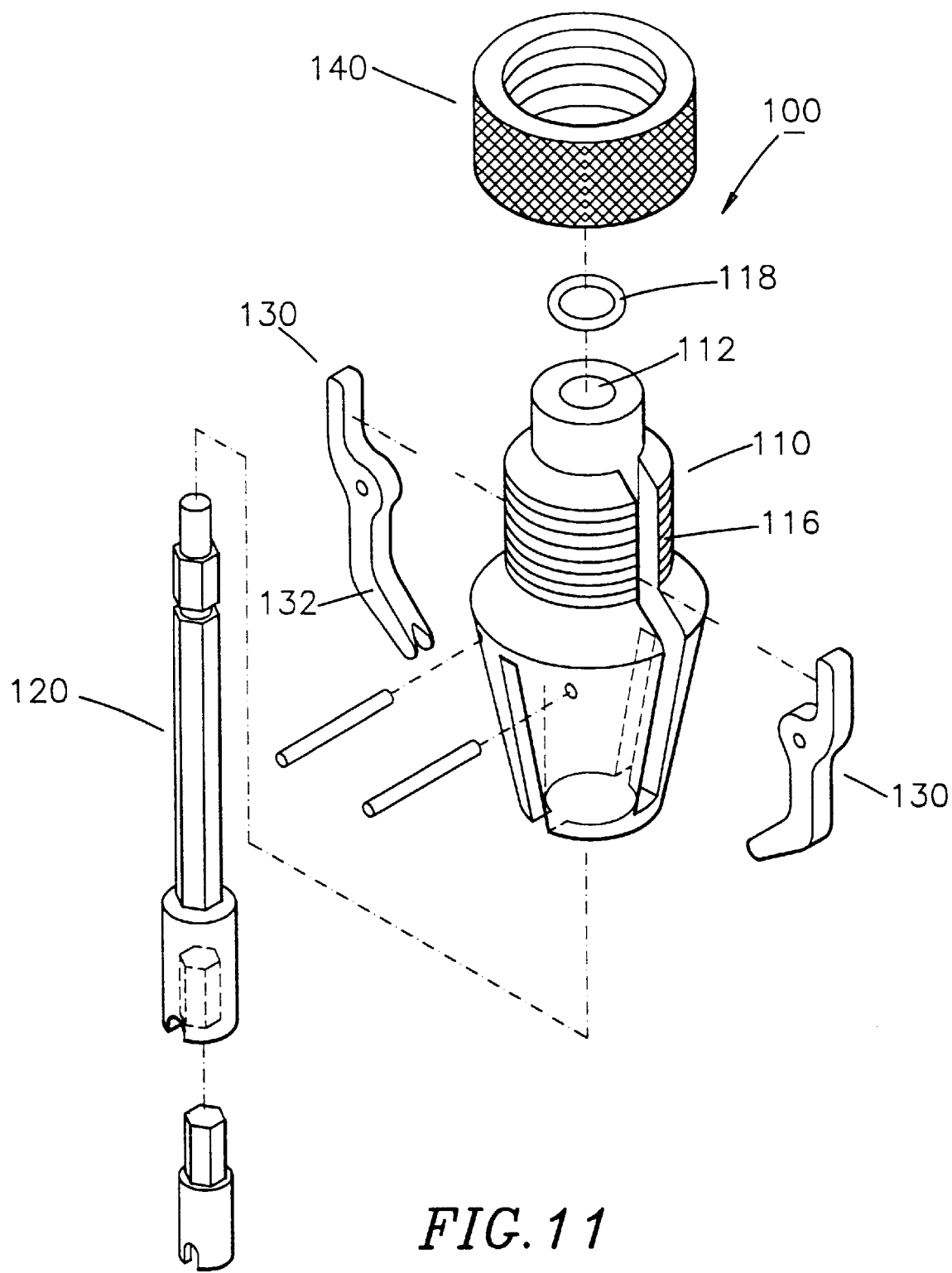
FIG. 11 is a perspective exploded view of a second embodiment of the present invention.
Figure 12:
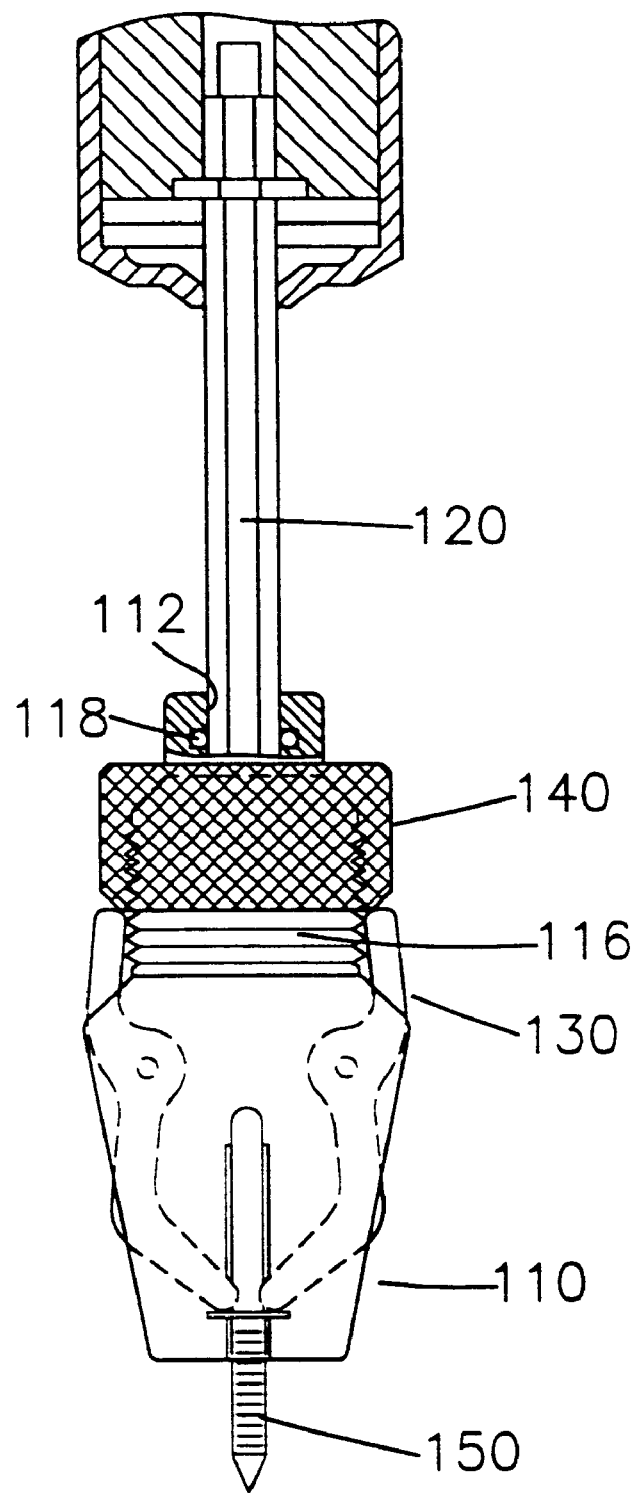
FIG. 12 is a sectional assembled view of the second embodiment of the present invention.

FIGS. 11 and 12 shows another embodiment 100 of the clamp of the present invention, which is substantially identical to the above embodiment. The difference between the two embodiments resides in that the circumferential face of the upper end of the main body 110 is formed with a threaded connecting section 116 and a locating member 118 is disposed in the passage 112. The locating member 118 is an O-ring. When the rod body 120 is passed through the passage 112 of the main body, the locating member 118 tightly touches the circumferential face of the rod body 120. When an operator slides the main body 110 along the rod body 120 to a certain position, the locating member 118 serves to locate the main body at the position by tight fit.

A pressing member 140 which is a nut in this embodiment is screwed on the connecting section 116 of the main body 110. When the pressing member 140 is screwed downward, the pressing member 140 presses the top ends of the two clamping members 130, making the clamping ends 132 of the clamping members 130 close toward each other so as to firmly clamp the self-tightening screw 150.

After the pressing member 140 is upward screwed to release the clamping members 130 from the pressing force, the clamping members become free and the bottom ends thereof are stretched outward. At this time, the self-tightening screw 150 is detached from the main body 110.

When clamping the self-tightening screw, this embodiment achieves a better tightness than the first embodiment. In addition, the main body 110 can be located at any position on the rod body so that it is unnecessary to dispose the springs 35 as the first embodiment. Instead, the two clamping members 130 are driven by the pressing member 140 to close.

Figure 13:
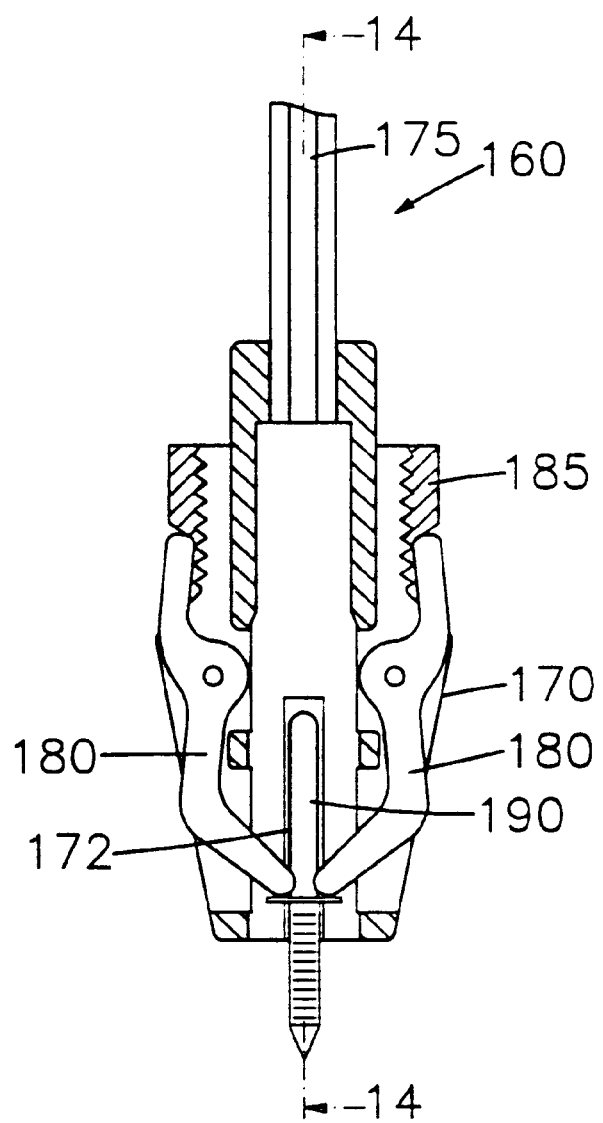
FIG. 13 is a longitudinal sectional view of a third embodiment of the present invention.
Figure 14:
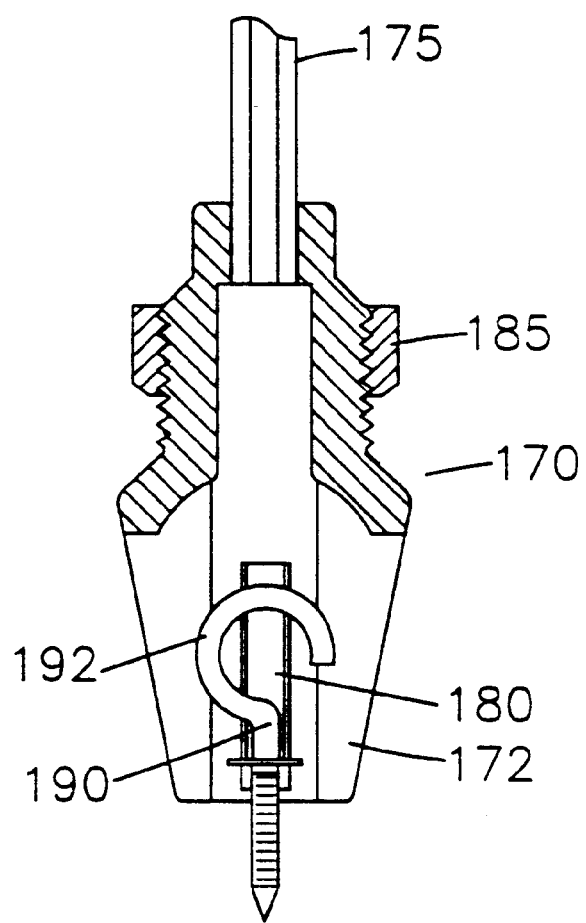
FIG. 14 is a sectional view taken along line 14—14 of FIG. 13.

FIGS. 13 and 14 show a third embodiment 160 of the present invention, in which the clamp serves to operate an interrogation-shaped self-tightening screw and an L-shaped self-tightening screw.

The bottom end of the rod body 175 is fixedly connected with top end of the main body 170 so that when rotating the rod body, main body is synchronously rotated.

The head 192 of the interrogation-shaped or L-shaped self-tightening screw 190 is passed through the cut 172 of the main body and clamped by the two clamping members 180. The pressing member serves to press the clamping members to keep clamping the screw.

When rotating the rod body 175, the main body 170 is synchronously rotated to screw the self-tightening screw 190. The head 192 of the screw extends into the cut 172 so as to be driven by the main body and screwed into a work piece.

The present invention has the following advantages:

1. The present invention has simple structure and can be accurately operated. Moreover, the present invention can be easily manufactured at low cost.
2. The present invention is able to clamp various types and dimensions of self-tightening screws so that the application range of the present invention is wider.

It is shown in the drawings that the height of the clamping ends of the clamping members is higher than that of the bottom end of the main body so that when the clamping ends are closed, they extend into the passage of the main body. However, in practice, the clamping ends can be alternatively positioned under the bottom end of the main body. Accordingly, the clamping ends are closed under the main body without extending into the main body.

The above embodiments are only used to illustrate the present invention, not intended to limit the scope thereof. Many modifications of the above embodiments can be made without departing from the spirit of the present invention.

What is claimed is:

1. A clamp for a threaded fastening member, comprising:
   a main body formed with an internal longitudinal passage, wherein the main body is formed with a radial cut, a face of which is parallel to a longitudinal direction of the main body, a bottom end of the cut passing through a bottom end of the main body;
   a rod body having a bottom end for driving a threaded fastening member, the rod body being fitted in the longitudinal passage, whereby the main body and the rod body are slidable relative to each other;
   at least two clamping members each having a bottom clamping end, the clamping members being pivotally disposed on the main body with the clamping ends opposite to each other for clamping an article, the clamping members being movable to open or close the clamping ends thereof; and
   at least one pressing member disposed on the main body for forcedly pressing the clamping members to close the clamping ends thereof.

2. The clamp for a threaded fastening member as claimed in claim 1, wherein when the clamping ends of the clamping members are closed, the clamping ends extend into the longitudinal passage of the main body.

3. The clamp for a threaded fastening member as claimed in claim 1, wherein when the clamping ends of the clamping members are closed, the clamping ends are positioned under the bottom of the main body.

4. The clamp for a threaded fastening member as claimed in claim 1, wherein a periphery of the main body has a plurality of slots, the number of slots corresponding to the number of clamping members, the clamping members being respectively pivotally disposed in the slots.

5. The clamp for a threaded fastening member as claimed in claim 4, wherein the slots are parallel to the longitudinal direction of the main body and communicate with the longitudinal passage, each clamping member being pivotally disposed in one of the plurality of slots with a top end of the clamping member protruding outside the main body, each clamping end extending from the slot into the longitudinal passage.

6. The clamp for a threaded fastening member as claimed in claim 1, wherein each clamping end has a clamping section.

7. The clamp for a threaded fastening member as claimed in claim 1, further comprising a resilient member disposed between the rod body and the main body, such that when the main body is not subject to an external force, the resilient member resiliently biases the main body toward the bottom end of the rod body.

8. The clamp for a threaded fastening member as claimed in claim 1, wherein the bottom end of the rod body has a fitting section, the clamp further comprising at least one driving member having a driving section at a bottom end thereof, the driving member being fitted in the fitting section of the rod body.

9. The clamp for a threaded fastening member as claimed in claim 1, wherein the bottom end of the rod body has a fitting section, the clamp further comprising a driving member having a radial fitting section at bottom end thereof, the driving member being fitted in the fitting section of the rod body.

10. The clamp for a threaded fastening member as claimed in claim 1, wherein the bottom end of the rod body has a fitting section, the clamp further comprising a driving member having a radial fitting section at a bottom end thereof, the radial fitting section passing through a first side of the driving member, while a second side of the driving member has a through hole coaxial with the radial fitting section.

11. The clamp for a threaded fastening member as claimed in claim 1, wherein the at least one pressing member is a resilient member disposed between the clamping members and the main body for resiliently biasing the clamping members.

12. The clamp for a threaded fastening member as claimed in claim 11, wherein the pressing member is disposed between a peripheral wall of the clamp and top ends of the clamping members.

13. The clamp for a threaded fastening member as claimed in claim 1, wherein the at least one pressing member is movable up and down on the main body and located on the main body, whereby movement of the pressing member serves to press the clamping members and close the clamping ends thereof toward each other or release a pressing force of the clamping members.

14. The clamp for a threaded fastening member as claimed in claim 13, wherein top ends of the clamping members are exposed outside the main body and a circumferential face of the upper end of the main body is formed with a threaded connecting section, the at least one pressing member comprising a nut screwed on the connection section, a bottom edge of the nut serving to press the top ends of the clamping members.

15. The clamp for a threaded fastening member as claimed in claim 1, wherein a locating member is disposed in the longitudinal passage, the locating member being tightly fitted around a circumferential face of the rod body to provide a frictional resistance, whereby the main body can be located on the rod body at a predetermined height.

16. The clamp for a threaded fastening member as claimed in claim 15, wherein the locating member comprises an O-ring disposed on a circumferential wall of the longitudinal passage.

17. The clamp for a threaded fastening member as claimed in claim 1, wherein the main body has a lower stop, such that, when sliding toward the bottom end of the rod body, the main body is prevented from detaching from the rod body.

18. A clamp for a threaded fastening member, comprising:
- a main body formed with a radial cut, a face of the cut being parallel to a longitudinal direction of the main body, a bottom end of the cut passing through a bottom end of the main body;
- a rod body having a bottom end fixedly connected with a top end of the main body;
- at least two clamping members each having a bottom clamping end, the clamping members being pivotally disposed on the main body with the clamping ends opposite to each other for clamping an article, the clamping members being movable to open or close the clamping ends thereof; and
- at least one pressing member disposed on the main body for forcedly pressing the clamping members to close the clamping ends thereof and keep the clamping ends clamping the article, wherein a periphery of the main body is formed with a plurality of slots, the number of slots corresponding to the number of clamping members, the clamping members being respectively pivotally disposed in the slots.

19. The clamp for a threaded fastening member as claimed in claim 18, wherein, when the clamping ends of the clamping members are closed, the clamping ends extend into the cut of the main body.

20. The clamp for a threaded fastening member as claimed in claim 18, wherein, when the clamping ends of the clamping members are closed, the clamping ends are positioned under the bottom end of the main body.

21. The clamp for a threaded fastening member as claimed in claim 18, wherein, each clamping end has a clamping section.

22. The clamp for a threaded fastening member as claimed in claim 18, wherein the plurality of slots are parallel to the longitudinal direction of the main body and communicate with the cut, each clamping member being pivotally disposed in one of the plurality of slots with a top end of the clamping member protruding outside the main body, each clamping end extending from the slot into the cut.

23. The clamp for a threaded fastening member as claimed in claim 18, wherein the at least one pressing member comprises a resilient member disposed between the clamping members and the main body for resiliently biasing the clamping members.

24. The clamp for a threaded fastening member as claimed in claim 18, wherein the at least one pressing member is movable up and down on the main body and located on the main body, whereby movement of the pressing member serves to press the clamping members and close the clamping ends thereof toward each other or release a pressing force of the clamping members.

25. The clamp for a threaded fastening member as claimed in claim 18, wherein top ends of the clamping members are exposed outside the main body and a circumferential face of the upper end of the main body is formed with a threaded connecting section, the at least one pressing member comprising a nut screwed on the connecting section, a bottom edge of the nut serving to press the top ends of the clamping members.

* * * * *